3,781,229
STORAGE STABLE PREMIX FOR PRODUCTION OF POLYURETHANE FOAM
William E. Smith and Charles M. Orlando, Schenectady, N.Y., and Robert W. Barito, Louisville, Ky., assignors to General Electric Company, Schenectady, N.Y.
No Drawing. Filed Oct. 31, 1972, Ser. No. 302,426
Int. Cl. C08g 22/34, 22/48, 41/04
U.S. Cl. 260—2.5 BE                                                6 Claims

ABSTRACT OF THE DISCLOSURE

A method for making rigid foam is provided by using an amine catalyst and blowing agent with a stable premix of an isocyanate terminated prepolymer and an epoxy resin. The premix is stabilized by the use of an effective amount of certain Lewis acid stabilizers, such as thionyl chloride.

---

The present invention relates to a method for making rigid foam and to certain foamable compositions employed in such method.

Rigid foam is extensively employed as wall insulation for a variety of manufactured items such as refrigerators, prefabricated houses, aircraft, etc. In addition, rigid foam is extensively employed as roof insulation on commercial and residential buildings. Rigid foam is often generated by the one shot method. The one shot method of generating foam requires mixing the ingredients used in making the foam immediately prior to dispensing the foam. A hydroxy containing organic material, such as a polyol, is caused to react with a polyisocyanate, utilizing an amine catalyst and a fluoroalkane blowing agent. The heat of reaction vaporizes the blowing agent which foams the polyurethane produced by the interaction of the polyisocyanate and the polyol. Although the "one shot method" is useful in particular instances, it is less suitable for continuously making rigid foam. In addition, the heat generated can be so intense that scorching of the foam can occur. Again, the ingredients must be carefully weighed out to minimize any excess of unreacted components.

A second approach to making foam involves the use of "polyurethane prepolymer" of the polyol and polyisocyanate often referred to as the two component or two-package approach. The two-package approach allows the fabricator the advantage of large scale foam production. Large batches of the polyurethane prepolymer which can be isocyanate terminated, can be stored. The amine catalyst can be separately stored with additional polyol. When the two components are brought together in an agitator along with blowing agent and amine catalyst, foam is generated which can be readily dispensed. In addition to allowing for large scale foam production, the use of the polyurethane prepolymer has the further advantage of generating less heat of reaction. However, the two component approach requires expensive metering and mixing equipment to produce the proper material balance between the isocyanate prepolymer and polyol in the reaction vessel prior to foaming. Because of exothermic heat of reaction, inadequate mixing often occurs before blowing and dispensing of the foam occurs. A critical dispensing time must be maintained to take advantage of the heat of reaction and the performance of the blowing agent. As a result, a build-up of hardened foam can form in the dispensing nozzle resulting in premature shut-down, maintenance, or nozzle replacement.

It would be desirable to have a foam forming premix which would eliminate the requirement of expensive metering equipment to maintain material balance between the prepolymer and polyol and minimized maintenance. In addition, it also would be desirable to have a foam forming premix which could be stored for an indefinite period of time, for example, six months, at ambient temperatures, such as temperatures of about 25° C. before premature gelation occurred. Attempts to form a premix have invariably resulted in failure. Isocyanate blocking, for example, is one way to prevent immediate reaction between the polyisocyanate and the polyol. This technique, however, is unsuitable for foam applications, since elevated temperatures are required to unblock the isocyanate. Preferably, the heat required to activate the blowing agent should be timed so that blowing occurs at the time the polymer is forming.

The present invention is based on the discovery that certain Lewis acids, such as phosphorous trichloride, phosphorous tribromide, and thionyl chloride can be employed as stabilizers in combination with a particular mixture of foam forming ingredients. The aforementioned stabilized mixture containing as essential ingredients, isocyanate terminated prepolymer, and an epoxy resin, can be employed as a premix for the generation of rigid foam. As a result, foam can be generated by simply agitating a mixture of the premix and blowing agent, and adding the amine catalyst or a mixture of the amine with additional blowing agent. The requirement of metering polyol and isocyanate terminated prepolymer immediately prior to foaming is thus eliminated.

There is provided by the present invention a method for making a rigid foam which comprises, (1) Agitating a mixture of a blowing agent, an amine catalyst, and a polyurethane foam forming premix.
(2) Allowing the resulting mixture of (1) to foam.
(3) Effecting contact between the resulting foam of (2) and a substrate.
(4) Allowing the foam to cure to the rigid state while it is in contact with the surface of such substrate where said foam forming premix comprises:
    (a) An isocyanate terminated polyol-prepolymer,
    (b) An epoxy resin, and
    (c) From 0.02% to 1.0% by weight of said foam forming premix of a Lewis acid stabilizer selected from the group consisting of thionyl chloride, phosphorous trichloride and phosphorus tribromide where in said premix there is present from about 0.8 to 1.5 epoxide equivalents of (b), per isocyanate equivalent of (a).

Preferably, a proportion of from 0.05% to 0.2% of Lewis acid stabilizer as previously defined, based on the weight of foamable mixture, can be used.

The polyurethane prepolymer which can be utilized in making the foam premix of the present invention can be made by standard procedure involving the reaction of a polyisocyanate and hydroxylated organic material, such as polyether polyol, or polyester polyol which materials will be more fully defined below. The aforementioned ingredients result in the production of an isocyanate terminated reaction product having an NCO/OH ratio of from about 4.5 to 7.5, and preferably from about 4.7 to 6. During the production of the polyurethane prepolymer, temperatures in the range of from 25° C. to 50° C. can be employed.

The epoxy resin which can be employed in combination with the polyurethane prepolymer is preferably made by reacting dihydric phenols, such as bisphenol A with epichlorohydrin. Generally speaking, epoxy resins which can be employed in the practice of the invention are those resins prepared from compounds containing an average of more than one epoxy group per molecule and are capable of being converted to useful thermosetting products. By equivalents of polyepoxide, is meant the molecular weight of the latter divided by the number of epoxy groups present in the molecule. A typical epoxy resin which can be employed herein is a condensate of the diglycidyl ether of bisphenol A wherein the mole ratio of epichlorohydrin to bisphenol A is varied to produce mixtures of this and higher molecular weight products such as

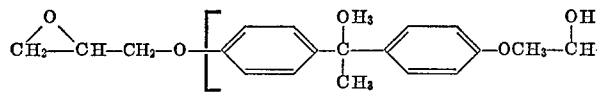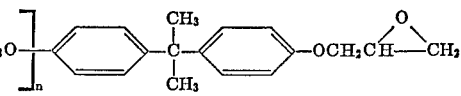

where $n$ can vary from about 0 to 20. Additional examples of epoxy resins which can be employed are shown in Encyclopedia of Polymer Science and Technology, vol. 6, 1967, Interscience Publishers, New York on pp. 209–271.

In preparing the foam forming premix, the order of addition of the isocyanate terminated prepolymer and the epoxy resin is not critical. The proportions of weight of the ingredients can vary widely depending on the viscosity restrictions and the range of equivalents of epoxide to isocyanate as previously defined. The blowing agent also can be incorporated into the premix if desired.

Preferably, halogenated aliphatic hydrocarbons, namely those having boiling ranges from about −40° C. to about 200° C., preferably from about −20° C. to about 110° C. can be employed as blowing agents. Some of the typical halogenated aliphatic hydrocarbons which can be employed are for example, difluoromonochloromethane,
trichloromonofluoromethane,
dichlorodifluoromethane,
chlorotrifluoromethane,
1,1,2-trichloro-1,2,2-trifluoroethane,
1,1-dichloro-1-fluoroethane,
1-chloro-1,1-difluoro-2,2-dichloroethane,
1,1,1-tribromo-2-chloro-2-fluorobutane,
methylene chloride, etc.

In the practice of the invention, foam formation takes place immediately after the various reactants as described above are mixed together. One procedure is incorporating a mixture of the tertiary amine catalyst and blowing agent into the premix as it is being stirred or agitated in a mixing vessel, which can be open or closed with a suitable dispensing orifice. An effective amount of amine catalyst is from 0.5 to 5.0% (depending on amine) by weight of the total foamable mixture of ingredients consisting of blowing agent, amine and the aforementioned premix. Suitable amine catalysts to which can be employed are, for example, dimethylaminoethanol,
triethylenediamine,
N-methylmorpholine,
N,N,N',N'-tetrakis(2-hydroxypropyl) ethylenediamine,
N,N,N',N'-tetramethyl-1,3-butanediamine,
1,2,4-trimethyl piperazine,
tetramethyl guanidine,
N,N-dimethyl ethanolamine,
2,4,6-tris(dimethylaminomethyl)phenol, etc.

forming occurs spontaneously upon mixing of the ingredients. Along with the blowing agent, amine catalyst, and premix a suitable surfactant, such as a silicone glycol copolymer also can be used in a proportion of 0.2 to 0.5% by weight of the total mixture. Some of the surfactants which can be used are for example DC-193, a block copolymer of a dimethylpolysiloxane and polyethylene oxide. The foam can be dispensed or poured into a mold or cavity, or onto the surface of a substrate such as a roof. If desired, subsequent curing of the foam can be effected at temperatures between 40° C. to 60° C.

The polyisocyanate employed in preparing the prepolymer of said invention can be any of the polyisocyanates known to be useful in the art of polymer formation. Included, for example are 2,4-tolyleneisocyanate, 2,6-tolyleneisocyanate, 4,4'-methylenebis(phenylisocyanate), di- anisidinediisocyanate, p,p'-diphenylmethyleneisocyanate, 1,4-diethylbenzene-β,β'-diisocyanate, etc. Other polyisocyanates which can be employed are shown in Hayash et al. Canadian Pat. 833,619.

Among the hydroxylated organic materials which can be employed to make the isocyanate terminated prepolymer when used in combination with the organic polyisocyanate are for example, polyoxyethylene glycol, polyoxypropylene glycol, polyoxybutylene glycol, polytetramethylene glycol, block copolymers, for example, combinations of polyoxypropylene and polyoxyethylene glycols; poly-1,2-oxybutylene, polyoxyethylene glycols; random copolymer glycols prepared from blends of a sequential addition of two or more alkylene oxides. In making a rigid polyurethane foam, polyether polyols having viscosities of from about 3800 to about 50,000 are preferred. Polyether-polyols which can be employed in the practice of the invention can have an average equivalent weight of from about 30 to 5000.

In addition to polyether-polyols, linear polyesters having chemically combined hydroxy radicals can be utilized in the practice of the invention as the hydroxylated organic material. The polyesters can be made by effecting reaction between a polycarboxylic acid and a polyglycol. Some of the polycarboxylic acids which can be employed in making the polyesters are oxalic acid, malonic acid, succinic acid, glutaric acid, adipic acid, palmitic acid, suberic acid, azelaic acid, sebacic acid, phthalic acid, isophthalic acid, terephthalic acid, halogenated phthalic acid, etc. Glycols which can be employed to make the polyesters utilized in the practice of the invention include 1,4-butanediol, 1,4-cyclohexanedicarbinol, ethylene glycol, etc.

As shown in copending application Ser. No. 302,427, filed concurrently herewith for Gene Trott and William Smith assigned to the same assignee as the present invention, certain dicarbonyl compounds, such as maleic anhydride and maleimide, etc. also can be employed as stabilizers for the premix employed in the practice of the present invention. The aforementioned stabilizers, however, can be distinguished from the stabilizers used in the present invention in that, stability in Ser. No. 302,427 is achieved for at least 180 days at ambient temperatures up to about 50° C. while with the stabilizers of the present invention, stability can be achieved at temperatures up to 30° C. for at least 180 days.

In order that those skilled in the art will be better able to practice the invention, the following example is given by way of illustration and not by way of limitation. All parts are by weight.

EXAMPLE

A prepolymer is prepared by stirring at 60° C. over a period of about two hours, a mixture of 40 parts of a sucrose-based polyol shown in Example A of Wismer et al. Pat. 3,153,002 and 160 parts of toluene diisocyanate. The resulting isocyanate terminated prepolymer is then mixed with 256 parts of an epoxy resin in the form of a condensate of epichlorohydrin and bisphenol A having a molecular weight in the range of 350–400. The resulting prepolymer-epoxy resin premix has a viscosity of about 4000 centipoises at 25° C. It has 0.9 equivalent of epoxide, per isocyanate equivalent of the prepolymer.

There is added to 114 parts of the above premix. 23.5 parts of Freon 11–B blowing agent, 1.5 parts of N,N-dimethylaminoethanol and 0.5 part of a silicone surfactant consisting of a copolymer of dimethylpolysiloxane and polyalkylene ether. The mixture is stirred and then poured into a 2" x 2' x 2' mold preheated at about 50° C. the mold is sealed. After one hour the mold is opened and a rigid foam panel was removed. The properties of the rigid foam, such as density, its insulating ability of K factor, and dimensional stability, are compared to a commercially available rigid polyurethane foam. The commercially available foam is prepared by the one-shot method from a mixture of an organic diisocyanate, and a sucrose-based polyol, using an amine catalyst and Freon 11-B blowing agent. The blowing agent is incorporated with the amine catalyst while the mixture of polyol and organic diisocyanate is stirred.

The following shows a comparison of the properties of the foam generated in accordance with the method of the invention, or "premix," and the commercially available foam or "comm.":

|  | Premix | Comm. |
|---|---|---|
| Density: |  |  |
| Overall, lb./ft.$^3$ | 1.62-2.05 | 1.5 |
| Core, lb./ft.$^3$ | 1.7-1.9 | 1.4 |
| K factor: |  |  |
| Overall | 0.110-0.127 | 0.123 |
| Core | 0.121-0.153 | 0.125 |
| Dimensional stability: |  |  |
| 7° C. | Excellent | Excellent |
| 66° C. | Excellent | Excellent |

The K factor is a measure of the insulating ability of the foam as shown by ASTM C177-63. Dimensional stability is a measure of the percent change in volume, as compared to initial volume at room temperature.

The remaining 342 parts of the base mixture of isocyanate terminated prepolymer and epoxy resin is then blended with 70.5 parts of blowing agent. The mixture is employed to determine the effectiveness of various materials as stabilizers over a six month shelf period at about 25° C.

A series of blends are prepared from the above base mixture having 0.1% by weight of the blend of the following compounds.

Group A:
  Thionyl chloride
  Phosphorous trichloride
  Phosphorous tribromide
Group B:
  Acetyl chloride
  Trimethylchlorosilane
  Trifluoroacetic
Group C:
  Hydrochloric acid
  Sulfuric acid
  Phosphoric.

The above blends are placed in covered containers at a temperature of about 28° C. to determine their effectiveness as stabilizers for the base mixture over 180 days. The base mixture free of the above compounds is also evaluated.

The base mixture free of compound transforms to a useless gum in about four days. The following results are obtained with the base mixture containing the above compounds.

| Group: | Gum forming time (days), 25° C. |
|---|---|
| A | >180 |
| B | <7 |

It also is found that Group C blend transforms to useless heterogenous material in less than seven days. The heterogenous material is found to be a fluid mixture containing a major amount of a gelatinous substance. An attempt is made to form a useful rigid polyurethane foam from the heterogenous material in accordance with the above procedure. The properties of the foam are found to be substantially inferior to the previously described foam properties.

After 180 days the base mixture containing the Group A stabilizers has a viscosity of less than 1000 centipoises compared to its original viscosity of about 300 centipoises when freshly prepared. It is found that rigid foam can be made readily from the Group A stabilized premix after 180 days at ambient temperatures. The foam is found to be substantially equivalent with respect to density, K factor and dimensional stability as the rigid foam made from the freshly prepared premix free of stabilizer as shown above.

Although the above example is limited to only a few of the very many varieties of premix and rigid foams which can be made in accordance with the method of the present invention, it should be understood a much broader variety of epoxy resins, isocyanate terminated polyols, amine catalysts, etc. can be used as set forth in the description preceeding this example.

What we claim as new and desire to secure by Letters Patent of the United States is:

1. A foamable, storage stable premix which comprises,
   (a) an isocyanate terminated polyol prepolymer,
   (b) an epoxy resin, and
   (c) from 0.02% to 1.0% by weight of said foamable premix of a Lewis acid selected from the class consisting of thionyl chloride, phosphorous trichloride, and phosphorous tribromide, where in said premix there is present from about 0.8 to 1.5 epoxide equivalents of (b), per isocyanate equivalent of (a).

2. A premix in accordance with claim 1, where the isocyanate terminated polyol prepolymer is a reaction product of toluene diisocyanate and a sucrose-based polyol.

3. A premix in accordance with claim 1, where the stabilizer is thionyl chloride.

4. A premix in accordance with claim 1, where the stabilizer is phosphorous trichloride.

5. A premix in accordance with claim 1, where the stabilizer is phosphorous tribromide.

6. A premix in accordance with claim 1, where the epoxy resin is a condensate of p,p'-dihydroxydiphenyl-dimethyl-methane and epichlorohydrin.

References Cited

UNITED STATES PATENTS

| 3,673,128 | 6/1972 | Hayash | 260—2.5 A |
| 3,494,888 | 2/1970 | McElroy | 260—830 P |
| 3,705,880 | 12/1972 | Matsuo | 260—77.5 R |
| 3,676,397 | 7/1972 | Clarke | 260—77.5 R |
| 3,676,380 | 7/1972 | McLaughlin | 260—2.5 AW |
| 3,644,234 | 2/1972 | Grieve | 260—2.5 AM |
| 3,620,987 | 11/1971 | McLaughlin | 260—2.5 AW |
| 3,415,901 | 12/1968 | Schramm | 260—77.5 R |
| 3,334,110 | 8/1967 | Schramm | 260—77.5 R |
| 3,313,747 | 4/1967 | Schramm | 260—7.5 R |
| 3,664,974 | 5/1972 | Cohen | 260—2.5 AJ |

DONALD E. CZAJA, Primary Examiner

C. W. IVY, Assistant Examiner

U.S. Cl. X.R.

260—2.5 A, 2.5 AC, 2.5 AJ, 2.5 AN, 2.5 AM, 2.5 AP, 2.5 AS, 77.5 R, 77.5 TB, 830 P